J. P. RADLEY.

Improvement in Potato-Diggers.

No. 132,923.                                    Patented Nov. 12, 1872.

Scale 1in. to 1ft.

Witnesses.
Cornelius VanDerzee
Chas J. Selkirk

John P. Radley
Inventor
His Attorney Alex. Selkirk

UNITED STATES PATENT OFFICE.

JOHN P. RADLEY, OF ALBANY, NEW YORK.

IMPROVEMENT IN POTATO-DIGGERS.

Specification forming part of Letters Patent No. 132,923, dated November 12, 1872.

*To all whom it may concern:*

Be it known that I, JOHN P. RADLEY, of the city and county of Albany, State of New York, have invented certain new and useful Improvements in Potato-Diggers; and I do hereby declare that the following is a description thereof, reference being had to the accompanying drawing forming a part of this specification, in which—

Figure 1:
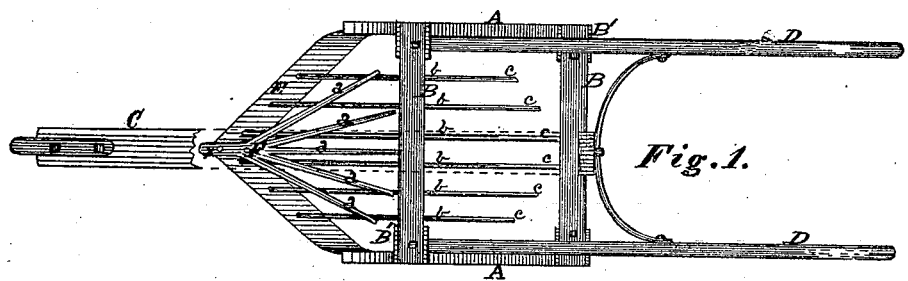
Figure 2:
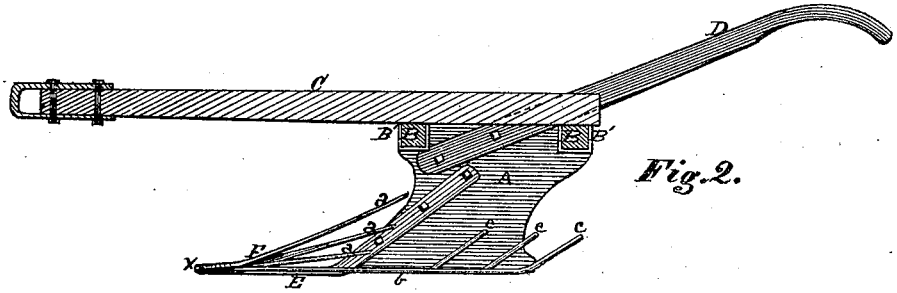
Figure 3:
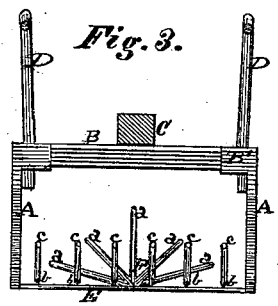

Figure 1 represents a vertical view of the potato-digger embodying the improvements in this invention. Fig. 2 is a sectional elevation of the same. Fig. 3 is a front view of the same.

My invention consists, in one part, of the combination of a cluster of sloping and diverging tines, with a share and land-sides in such a manner as to be capable of breaking up the hill at its center and scattering the same within the space between the said land-sides; the object of this part of my invention being to upheave the hill and its contents from the bottom of the same, and spread the mixed soil and potatoes over a considerable space with a slight depth, and yet confine the same to the space between the land-sides. Another part of my invention consists in the combination of a draw-beam, cross-bars, and sockets with the land-sides and share in such a manner that each of the said several parts will coact to strengthen and hold in position the other parts.

To enable others skilled in the art to make and use my invention, I will proceed to describe it in reference to the drawing and the letters of reference marked thereon, the same letters indicating like parts.

In the drawing, A A represent two land-sides about thirty inches apart, more or less, which land-sides are firmly secured to the cross-beams B B by means of the sockets B' B' made with the said land-sides, and proper binding-bolts passing through the same, as shown. C is the draw-beam, secured in a firm manner to the cross-beams B B, Figs. 2 and 3. D D are the handles of the machine, which are properly secured to the land-sides A A, and firmly braced. E is the share, made preferably of steel, with a V-shaped form, and is secured to the land-sides A A at their extremities in such a manner as to bring the point of the said share in line with the center of the machine and forward of the land-sides, as shown in Fig. 1. F is a cluster of tines, *a a a*, made preferably of steel, and arranged in a fan-like position, with their terminating ends radiating from a common central point or heel, by which the said cluster is secured to the point of the share E, as shown in Figs 1 and 2. The several tines *a a* of the said cluster are so arranged that their terminating and spreading ends will be of varying heights, the outer tines being the lowest, while each adjacent tine will rise a little higher, ending with the center tine being the highest, as shown in Figs. 2 and 3. By this arrangement of the said cluster of tines with the said share and the land-sides the soil containing the tubers to be dug will be cut below the line of the usual bottom of the hill, and will be received on the point of the said cluster of tines, to be gradually raised up, broken, and spread out over a space of ground equal to the space between the land-sides, the soil and potatoes gradually falling down through the spreading spaces between the tines as the machine is moving along. The said tines should be made strong and rigid, and be polished quite smooth, and be secured to the point of the share in such a manner as to be unyielding in the least, so as to resist all tendency of the soil pressing the same together. *b b b* are a series of parallel rods, secured to the rear edge of share E in a firm and unyielding manner by bolts or riveting or otherwise. The said rods run back in a horizontal manner on the same plane with the share E, and are of varying lengths, as shown in Figs. 1 and 2, and are intended to act as connection pieces between the said share E and the incline gathering-fingers *c c c*, formed with or attached to the ends of the said connecting-rods *b b*. The front and depressed ends of the several gathering-fingers connect with their rods at points a little back of its outer adjoining rod and finger, and in such a manner that the said fingers will be made to range in the form of an angle or a curve as they drop back of each other, commencing at the side fingers, and stopping at the center finger or fingers, as shown in Figs. 1 and 2. The said fingers *c c* are also placed at an incline, with their upper ends rising about four or five inches above the plane of the connecting-rods, as shown in Fig. 2. The said fingers, thus inclined and arranged in an angular row, are intended to operate so as to work the potatoes which were previously scattered by the tines a a from the outside toward the center of the row being passed over.

The manner in which the several parts of the machine operate is as follows: As the machine is drawn along over the row to be dug, with the land-sides A A passing outside the hills, and the hills about central between the same, which land-sides, thus running, will prevent the soil and tubers from being thrown out beyond the reach of the gathering-fingers c c. As the machine is being drawn along the share will enter and cut below the potatoes, and part the soil containing the potatoes from the solid soil below the hill, which parted soil will be received on the cluster F of tines a a, together with the potatoes, and be loosened up and scattered over all the space between the land-sides A A by said tines being drawn obliquely, in their fan-like position, against the soil and potatoes, which will break through the spaces between the said tines, and fall below, leaving the potatoes partly raised above the soil.

These improvements are well adapted for most soils in which potatoes are grown; and will enable the digger to operate without being clogged with vines or weeds, because the operating parts pass beneath the same. They also effect both a lateral working of the soil and the potatoes from the center of the row to the outside over a considerable surface.

Having described my invention, what I claim, and desire to secure by Letters Patent, is—

1. The combination of the cluster F of diverging and sloping tines a a a, with the share E and land-sides A A, when all are constructed and arranged substantially as and for the purpose set forth.

2. In combination with the land-sides A A and share E, the draw-beam C, cross-beams B B, and sockets B' B', when all are arranged and constructed substantially as and for the purpose set forth.

JOHN P. RADLEY.

Witnesses:
GEORGE DOWNING,
ROBERT HILLSON.